United States Patent
Wetter et al.

(10) Patent No.: US 9,688,318 B1
(45) Date of Patent: Jun. 27, 2017

(54) AXLE SUSPENSION MOUNTING SYSTEM

(71) Applicants: Michael S. Wetter, Orange City, IA (US); Joel D. Van Den Brink, Rock Valley, IA (US)

(72) Inventors: Michael S. Wetter, Orange City, IA (US); Joel D. Van Den Brink, Rock Valley, IA (US)

(73) Assignee: LINK MFG., LTD., Sioux Center, IA (US)

( * ) Notice: Subject to any disclaimer, the term of this patent is extended or adjusted under 35 U.S.C. 154(b) by 236 days.

(21) Appl. No.: 14/751,647

(22) Filed: Jun. 26, 2015

(51) Int. Cl.
*B62D 33/10* (2006.01)
*B62D 27/02* (2006.01)
*B62D 21/09* (2006.01)

(52) U.S. Cl.
CPC ............. *B62D 33/10* (2013.01); *B62D 21/09* (2013.01); *B62D 27/02* (2013.01)

(58) Field of Classification Search
CPC ........ B62D 33/10; B62D 21/09; B62D 27/02; B60G 7/02; B60G 9/003; B60G 9/02
See application file for complete search history.

(56) References Cited

U.S. PATENT DOCUMENTS

| | | | |
|---|---|---|---|
| 6,311,993 B1 | 11/2001 | Hulstein et al. | |
| 9,315,083 B2 * | 4/2016 | Noble | B60G 7/02 |
| 9,315,222 B1 * | 4/2016 | Wetter | B60G 9/02 |
| 2008/0084047 A1 * | 4/2008 | Bluff | B60G 7/02 280/423.1 |
| 2010/0253032 A1 * | 10/2010 | Ramsey | B60G 5/047 280/124.162 |
| 2012/0284973 A1 * | 11/2012 | Glaser | F16B 5/121 24/457 |
| 2013/0062852 A1 * | 3/2013 | Dodd | B60G 9/00 280/124.117 |
| 2015/0273972 A1 * | 10/2015 | Plath | B60G 17/019 701/37 |
| 2016/0152106 A1 * | 6/2016 | Preijert | F16F 1/26 280/124.116 |

* cited by examiner

*Primary Examiner* — Darlene P Condra
(74) *Attorney, Agent, or Firm* — Dennis L. Thomte; Thomte Patent Law Office LLC

(57) ABSTRACT

An auxiliary axle or lift axle is pivotally mounted to the frame of a vehicle for selectively providing additional flotation for the vehicle. A pair of frame brackets are secured to the frame members of the vehicle and have horizontally disposed mounting plates adjacent to the lower ends thereof. A bracket member extends downwardly from one end of the mounting plate and has a pair of spaced-apart slots formed therein. A bracket member also extends downwardly from the other end of the frame bracket and has a pair of spaced-apart first and second slots formed therein. The hanger brackets are adjustably secured to the bracket members to permit the axle assembly to be mounted on frame members having varying distances therebetween and having varying frame thicknesses. The novel method of securing the hanger brackets to the frame brackets is also disclosed.

8 Claims, 10 Drawing Sheets

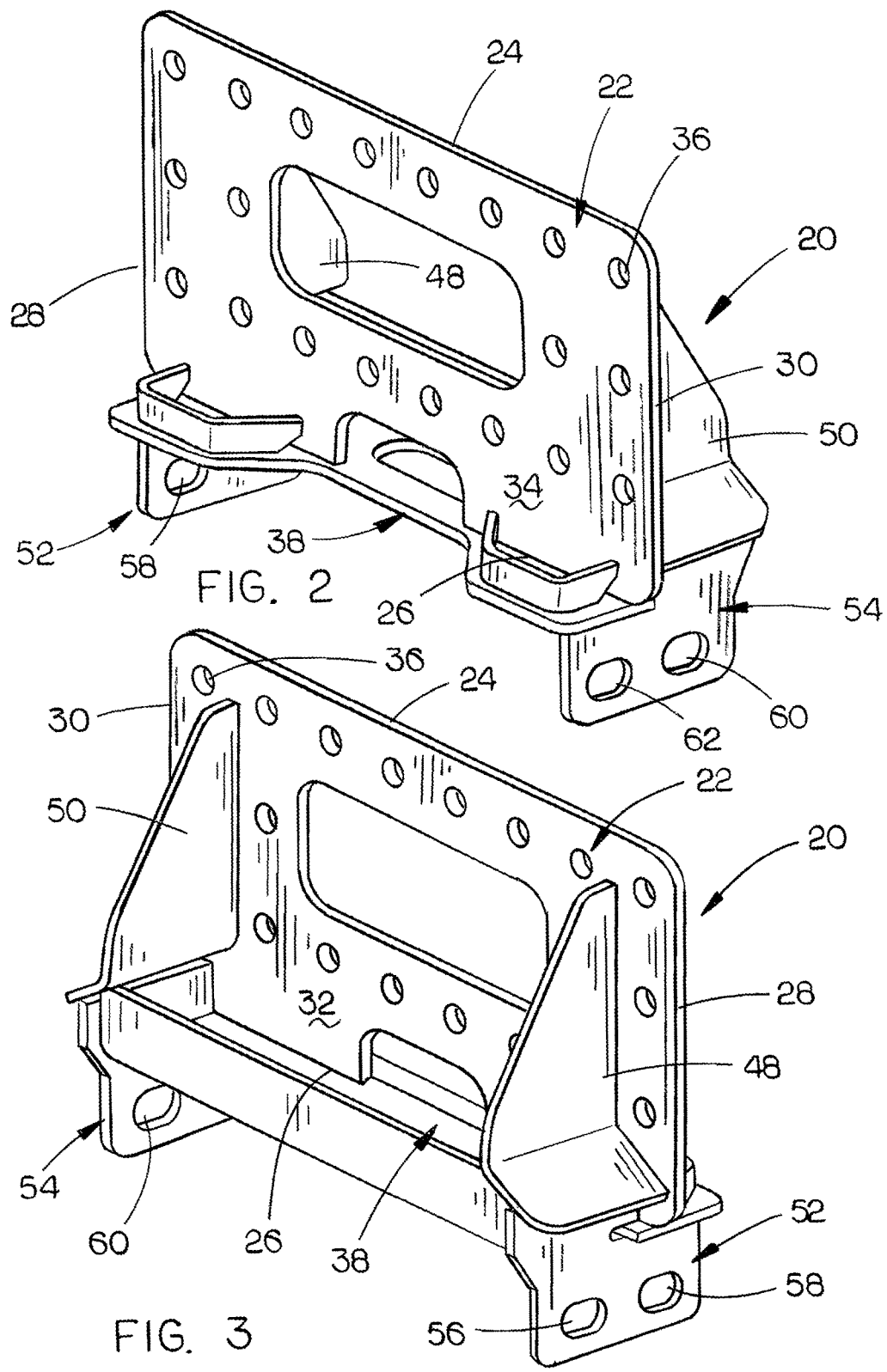

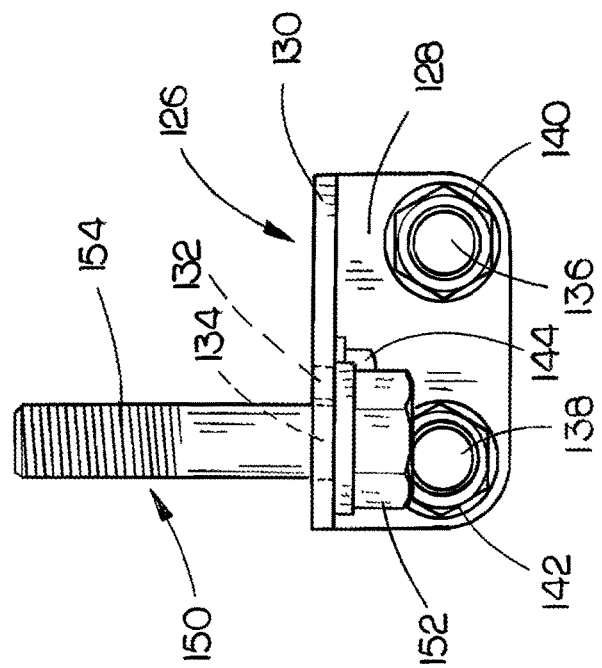
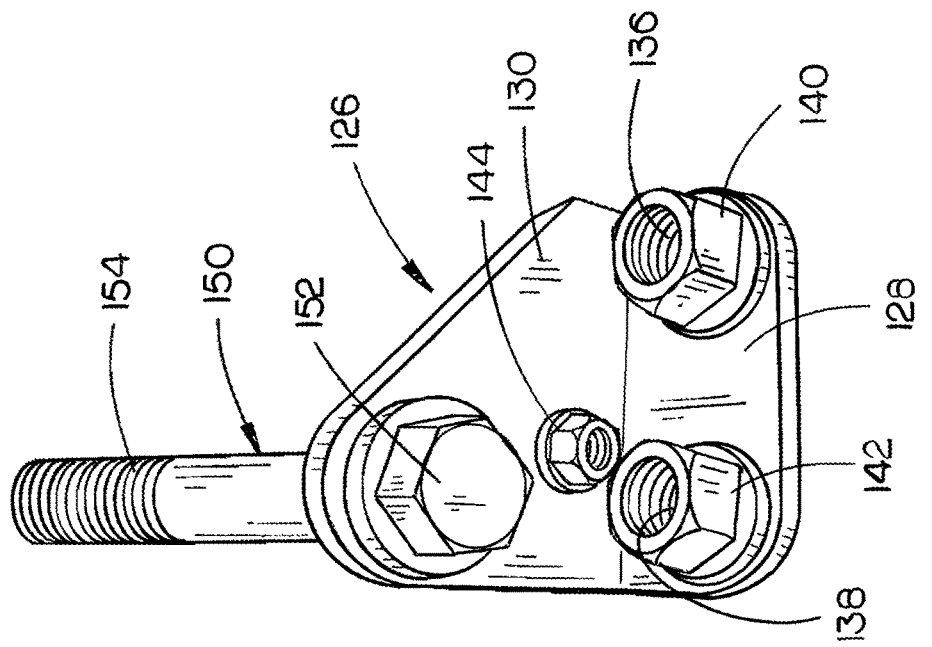
FIG. 10
FIG. 9

AXLE SUSPENSION MOUNTING SYSTEM

BACKGROUND OF THE INVENTION

Field of the Invention

This invention relates to an axle suspension mounting system and more particularly to a lift axle suspension mounting system wherein the lift axle suspension assembly is secured to the frame of a truck between the tandem axles and the cab of the truck. The lift axle suspension assembly may also be mounted on the rearward end of the frame rearwardly of the tandem axles. The lift axle suspension assembly is pivotally movable with respect to the vehicle between a first position in which the wheels of the lift axle are elevated and a second position in which the wheels of the lift axle engage the ground. More particularly, the lift axle suspension mounting system of this invention is designed to fit truck frames having varying dimensions. Even more particularly, the lift axle suspension mounting system of this invention represents an improvement over assignee's earlier lift axle suspension mounting system described and shown in U.S. Pat. No. 6,316,993 B1. Although the axle suspension system of this invention is well suited for use with a lift axle, it is also well suited for use with auxiliary axles which are not of the lift type.

Description of the Related Art

Lift axle assemblies have been used for many years on work vehicles such as transit concrete mixers, gravel trucks, etc. The lift axle assemblies of the prior art permit the vehicle to carry more weight while still meeting the regulations governing the weight which the vehicles can legally carry over federal and state highways. Most of the prior art lift axle assemblies are pivotally movable with respect to the frame of the vehicle so that the wheels of the lift axle assembly may be pivotally moved from a ground engaging position to an elevated position.

Assignee's lift axle suspension mounting system described and shown in U.S. Pat. No. 6,311,993 represented a significant advance and improvement in the lift axle suspension mounting systems of the prior art. The instant invention represents a further advance in the art in that it is more convenient to assemble than the system of the '993 patent.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An axle suspension mounting system is provided which includes first and second frame brackets secured to the first and second frame members of a load-bearing vehicle. As used herein, the term vehicle includes trucks with primary and auxiliary suspensions and trailers with primary and auxiliary suspensions. Each of the first and second frame brackets include a vertically disposed first mounting plate configured to be secured to the associated frame member. A horizontally disposed and elongated second mounting plate is secured to lower end of the first mounting plate. A first bracket member extends downwardly from the first end of the frame bracket and is transversely disposed with respect to the longitudinal axis of the associated frame member. The first bracket member has first and second horizontally disposed slots formed therein. A vertically disposed second bracket member extends downwardly from the second end of the frame bracket and is transversely disposed with respect to the longitudinal axis of the associated frame member. The second bracket member has first and second horizontally disposed slots formed therein.

The mounting system of this invention also includes first and second hanger brackets which are adjustably secured to the first and second frame brackets. Each of the hanger brackets has a first end wall, a second end wall, a first side wall, a second wall, a top wall and a lower end. First and second mounting straps are positioned within each of the hanger brackets and are secured thereto beneath the top wall thereof. Each of the mounting straps has first and second bolts secured thereto which extend upwardly through the top wall of the hanger bracket for reception by openings in the second mounting plate of the associated frame bracket.

A pair of bolts extend inwardly through the slots of the first bracket member of the associated frame bracket, through holes in upper end of the first end wall for connection to nuts fixed to the first mounting strap. A pair of bolts extend inwardly through the slots of the second bracket member of the associated frame bracket, through holes in the upper end of second end wall for connection to nuts fixed to the second mounting strap.

Although the axle suspension system of this invention is well suited for use with a lift axle, it is also well suited for use with auxiliary axles or suspension systems which are not of the lift type.

It is therefore a principal object of the invention to provide an improved mounting system for a lift axle assembly or an auxiliary axle assembly for a vehicle such as a truck or trailer.

Still another object of the invention is to provide an axle suspension mounting system which accommodates frame width variations and frame thickness variations.

Yet another object of the invention is to provide an axle suspension mounting system which is extremely safe to use.

Yet another object of the invention is to provide an axle suspension mounting system which is quickly and easily bolted onto the frame members of the vehicle.

Still another object of the invention is to provide an axle suspension system which is more convenient to assemble than the prior art systems.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a perspective view of one of the bracket members of this invention;

FIG. 3 is another perspective view of the bracket member of FIG. 2;

FIG. 9 is a perspective view of one of the mounting straps of this invention;

FIG. 10 is an inner side view of the mounting strap of FIG. 9;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the lift axle suspension mounting system of this invention which represents an improvement of Assignee's U.S. Pat. No. 6,311,993 B1, the disclosure of which is relied upon to complete this disclosure if necessary. The system 10 of this invention may be used with a lift axle suspension system of the "tag" type or a lift axle suspension system of the "pusher" type. If the lift axle suspension system is of the "pusher" type, the system 10 will be secured to the longitudinally extending frame members of the vehicle between the cab of the vehicle and one or more axles which may be driven or non-driven. If the lift axle suspension system is of the "tag" type, the system 10 will be secured to the frame members of the vehicle rearwardly of one or more axles which may be driven or non-driven. In the description of the preferred embodiment, the system 10 will be described as being of the pusher type with it being understood that the system 10 could be used with the tag type lift axle suspension system.

The system 10 is mounted to a vehicle 12 including first and second longitudinally extending frame members 14 and 16 having forward and rearward ends, and inner and outer sides. Vehicle 12 may be any vehicle requiring additional flotation in order for the vehicle to comply with state and federal highway regulations. As used herein, the term vehicle includes trucks with primary and auxiliary suspensions and trailers with primary and auxiliary suspensions.

Figure 1:
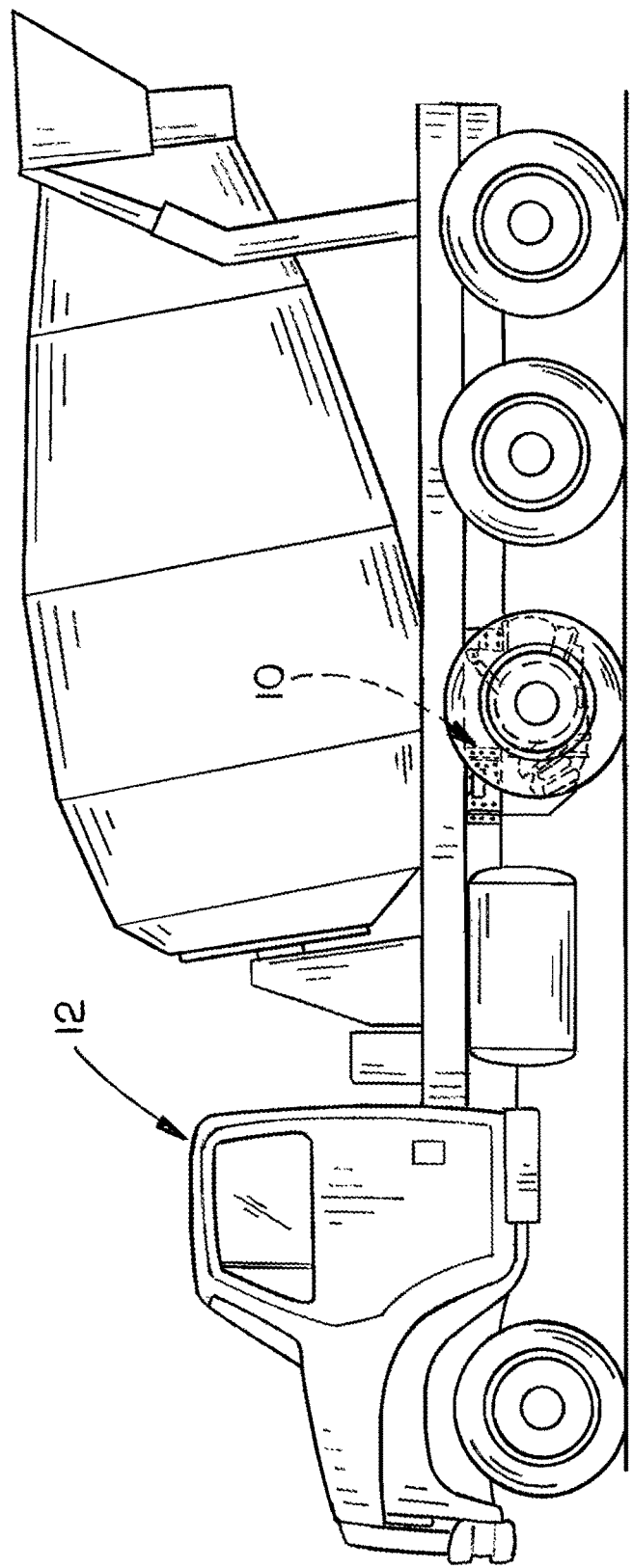
FIG. 1 is a side view of a load-bearing vehicle having a lift arm suspension system of the pusher type secured thereto.
Figure 4:
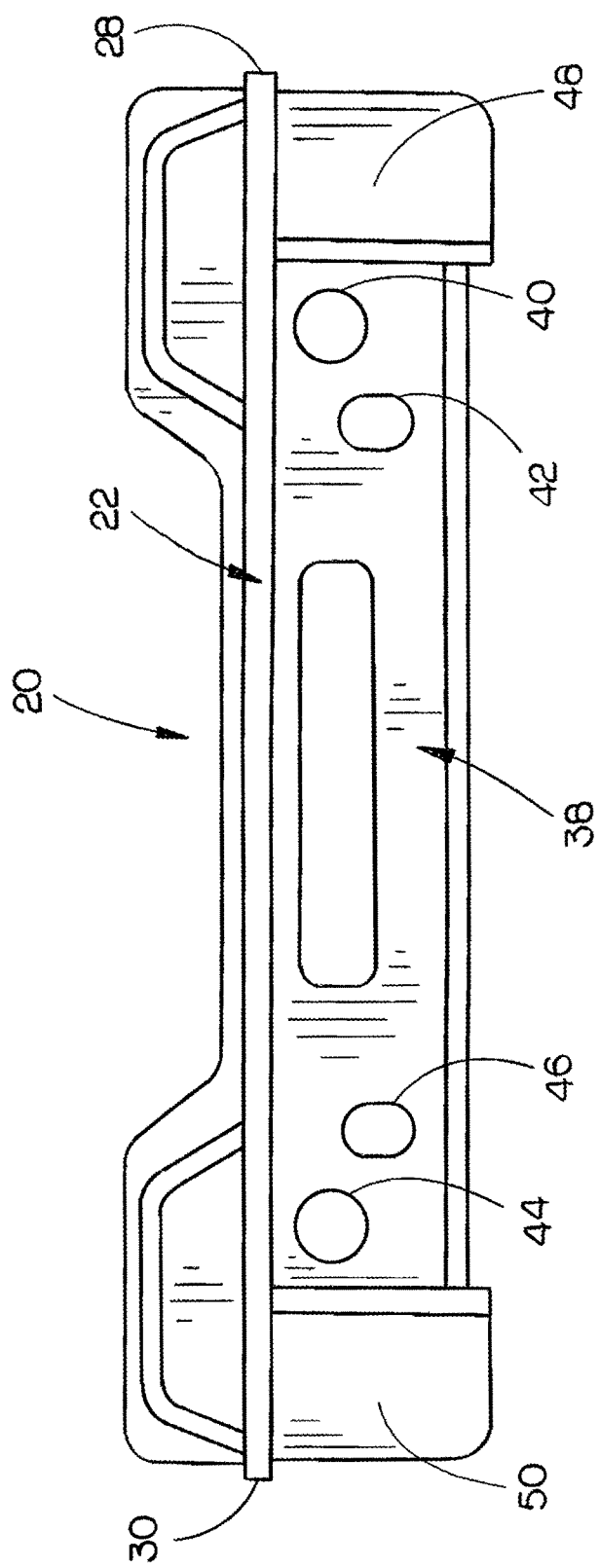
FIG. 4 is a top view of the bracket member of FIG. 2.
Figure 5:
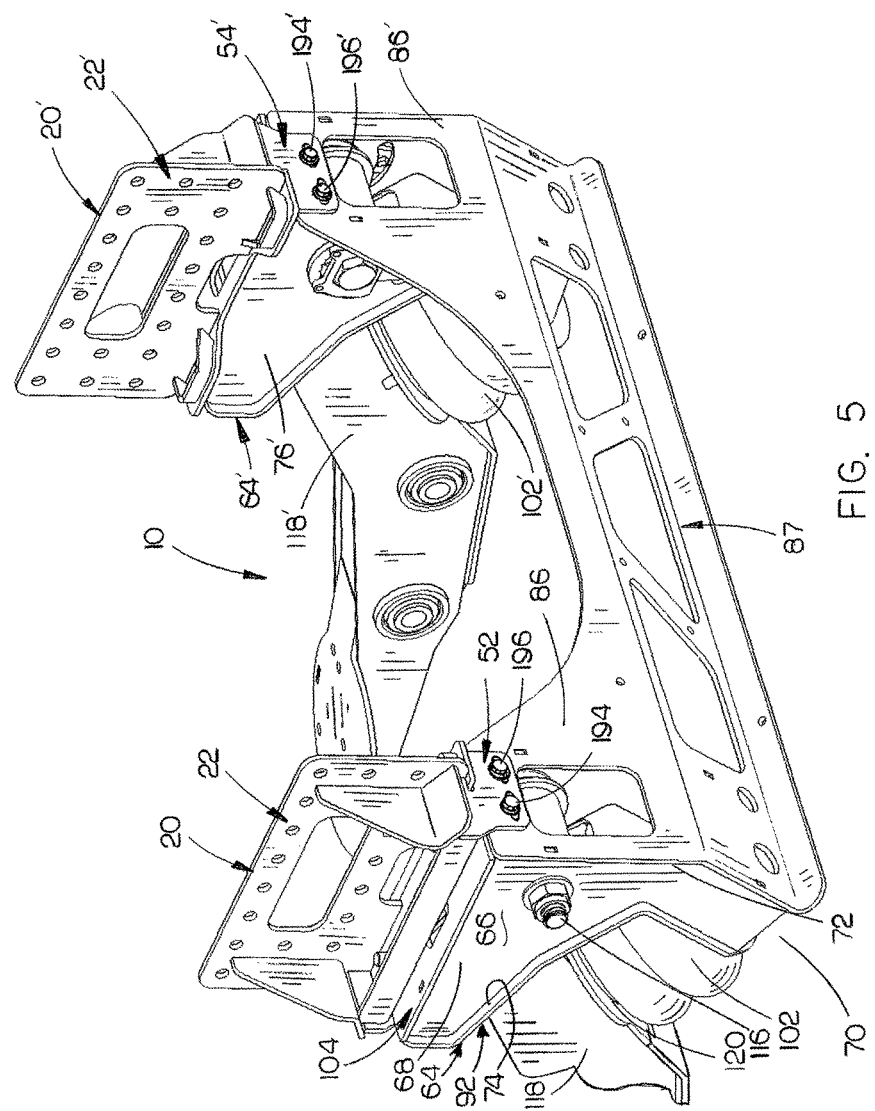
FIG. 5 is a perspective view of the lift axle suspension mounting system of this invention.
Figure 6:
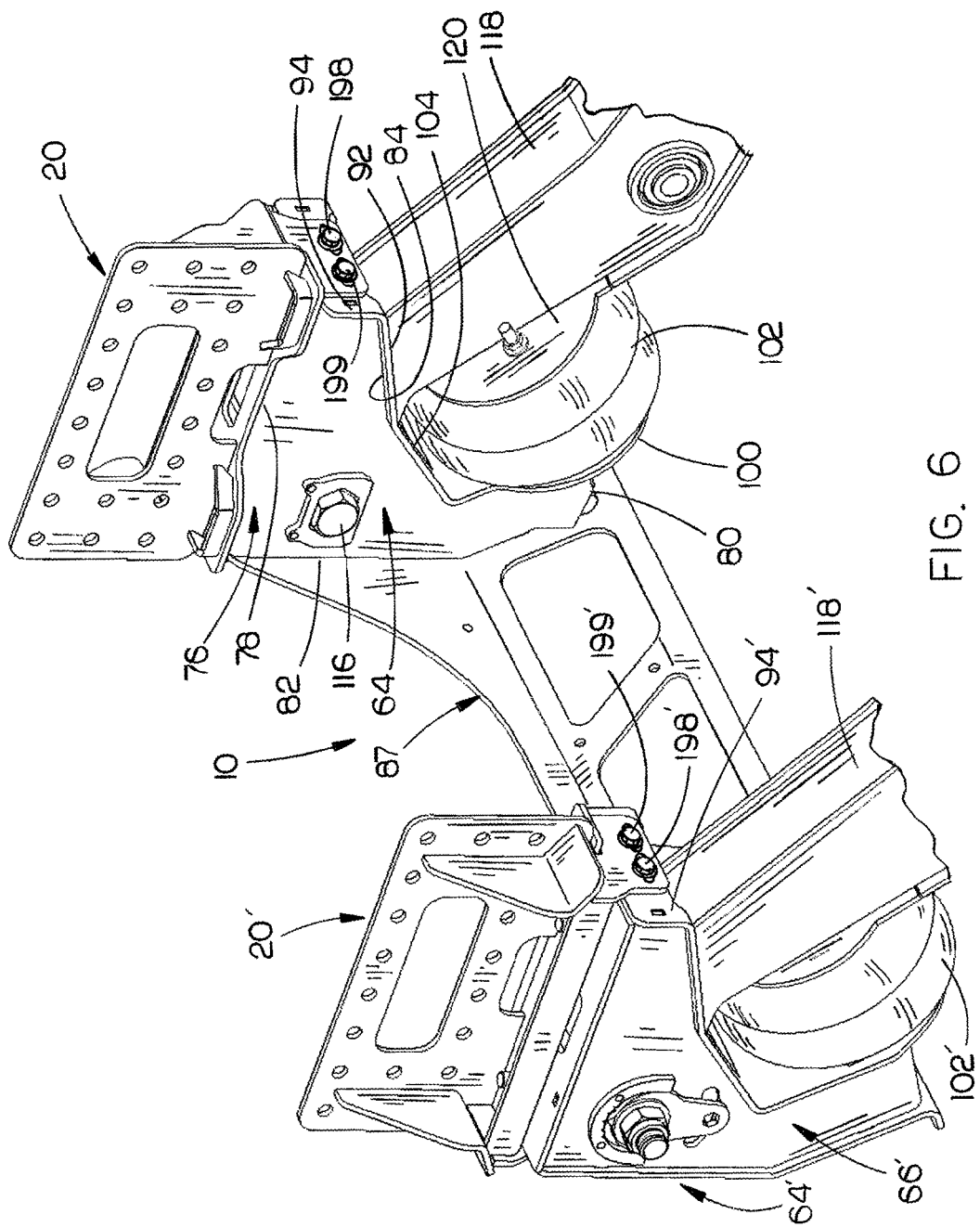
FIG. 6 is another perspective view of the lift axle suspension mounting system of this invention.
Figure 7:
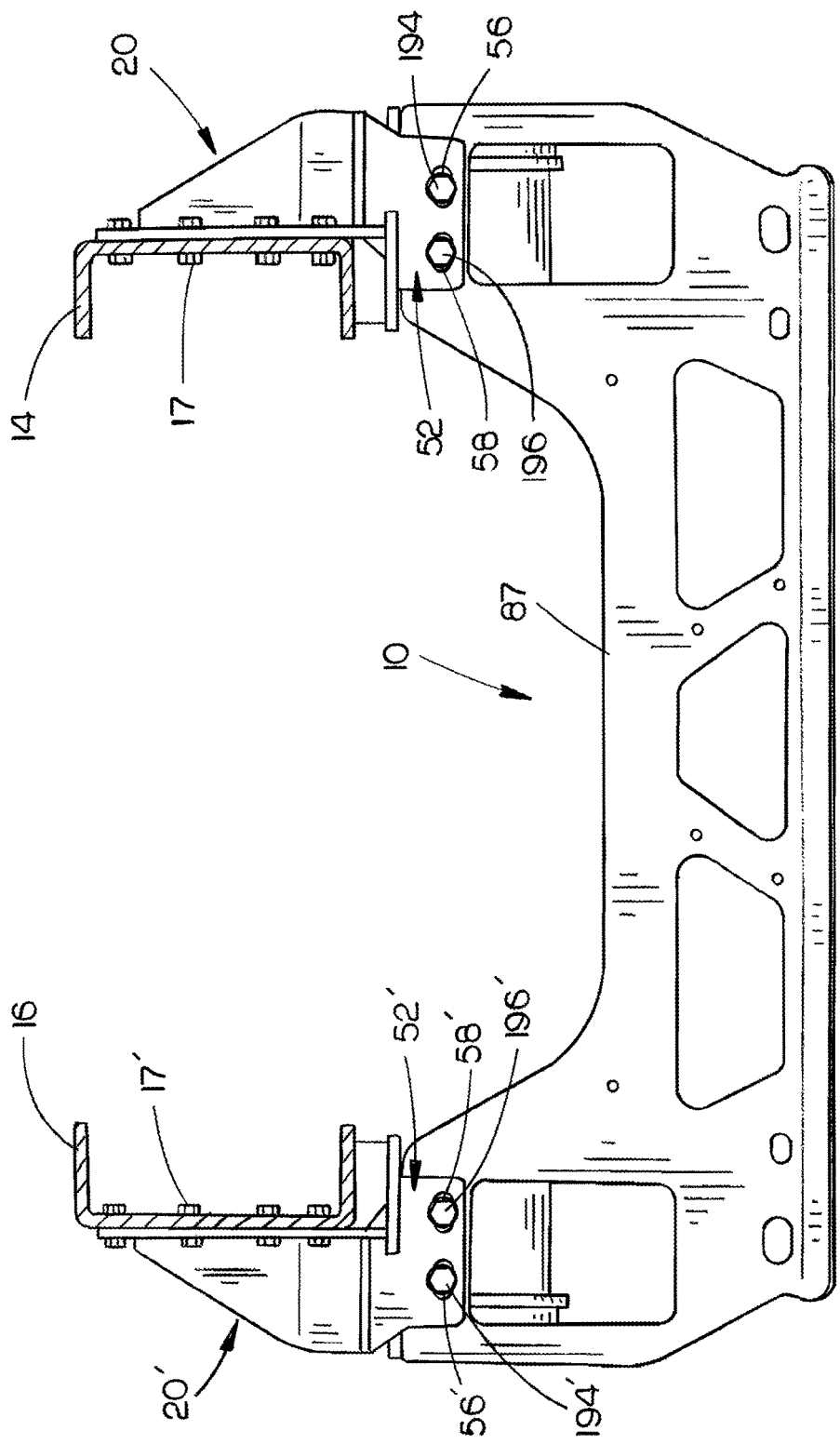
FIG. 7 is an end view of the lift axle suspension mounting system of this invention.
Figure 8:
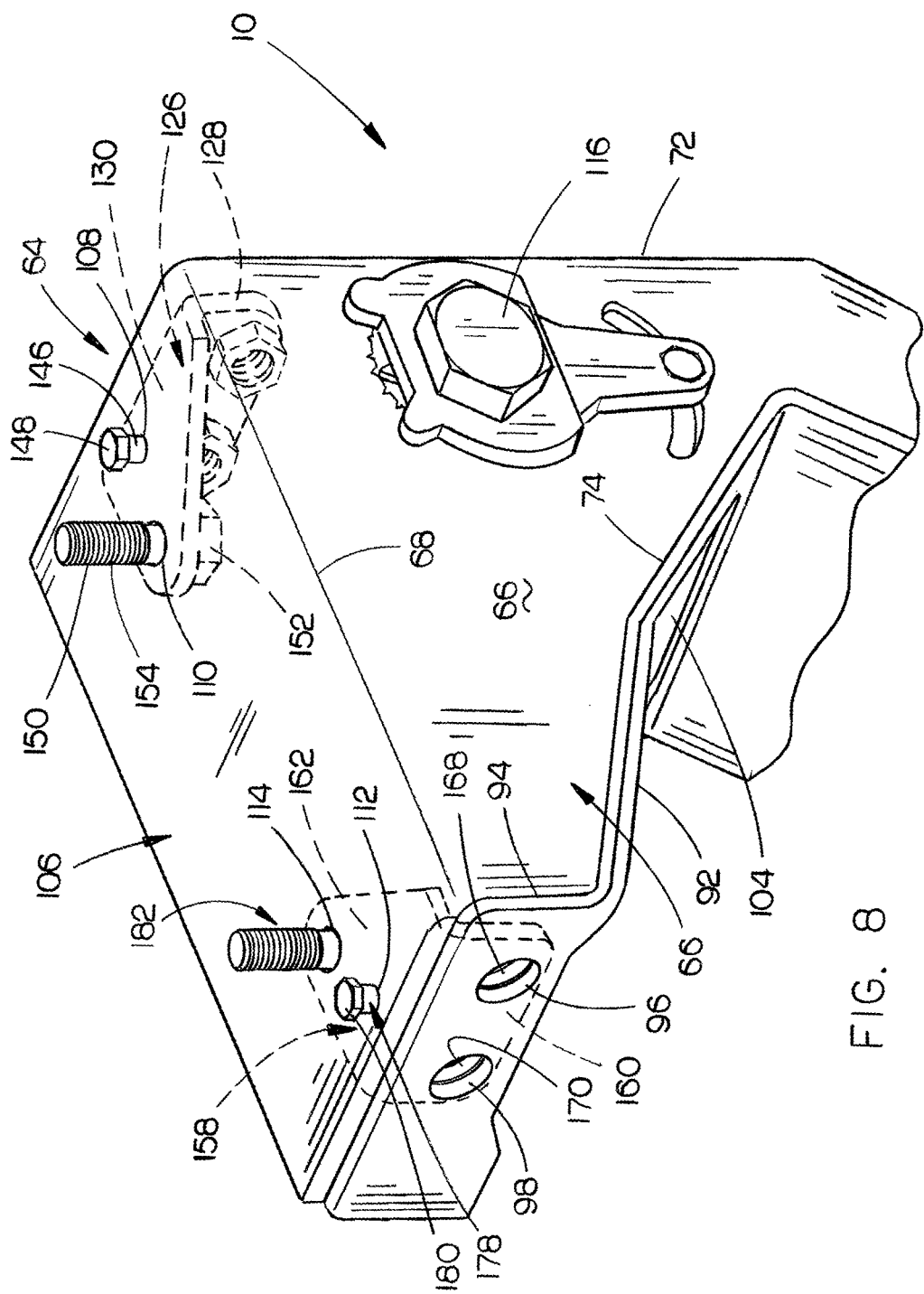
FIG. 8 is a partial perspective view of one of the hanger brackets of this invention.
Figure 11:
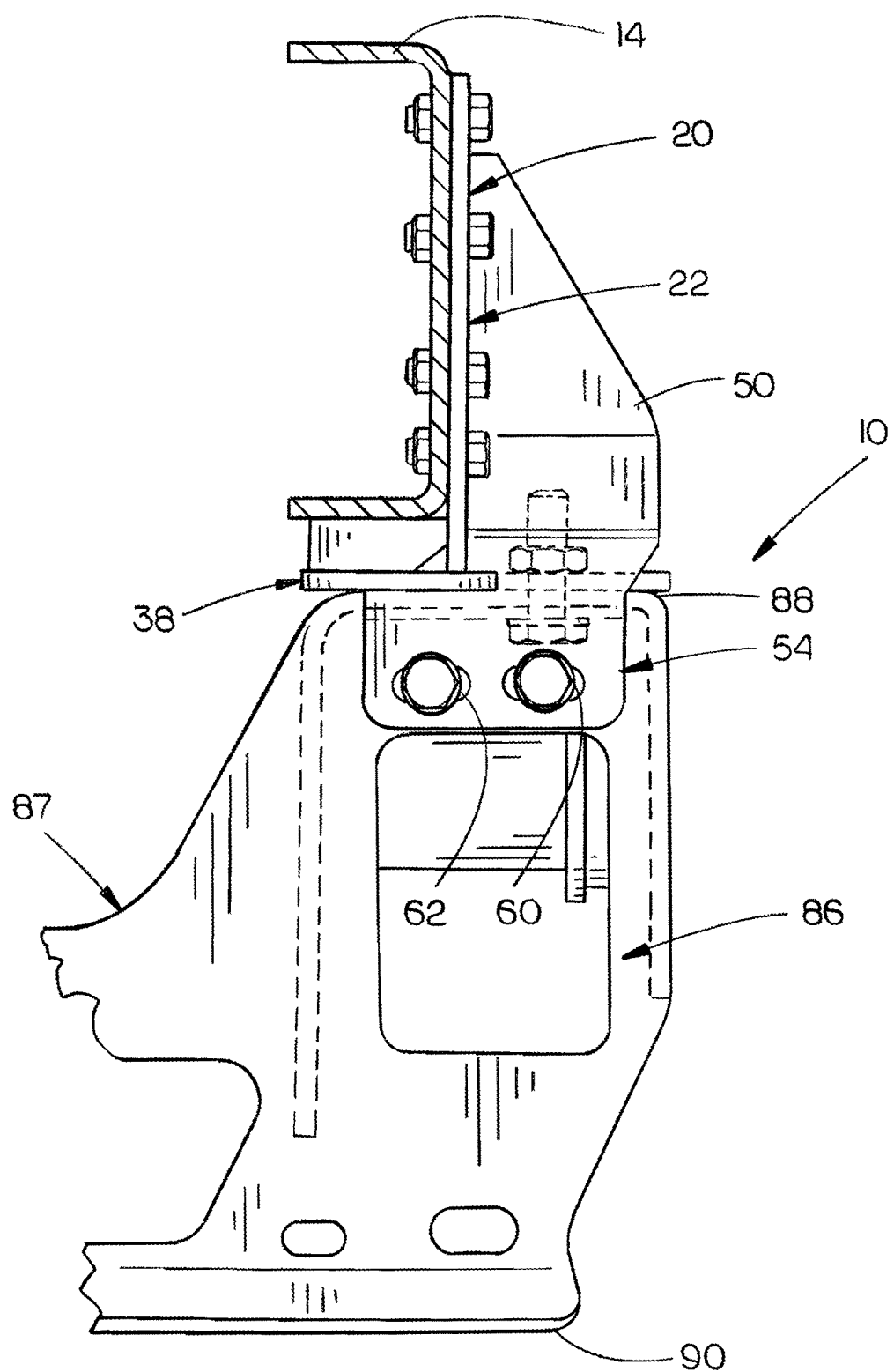
FIG. 11 is a partial end elevation view of the mounting system of this invention.
Figure 12:
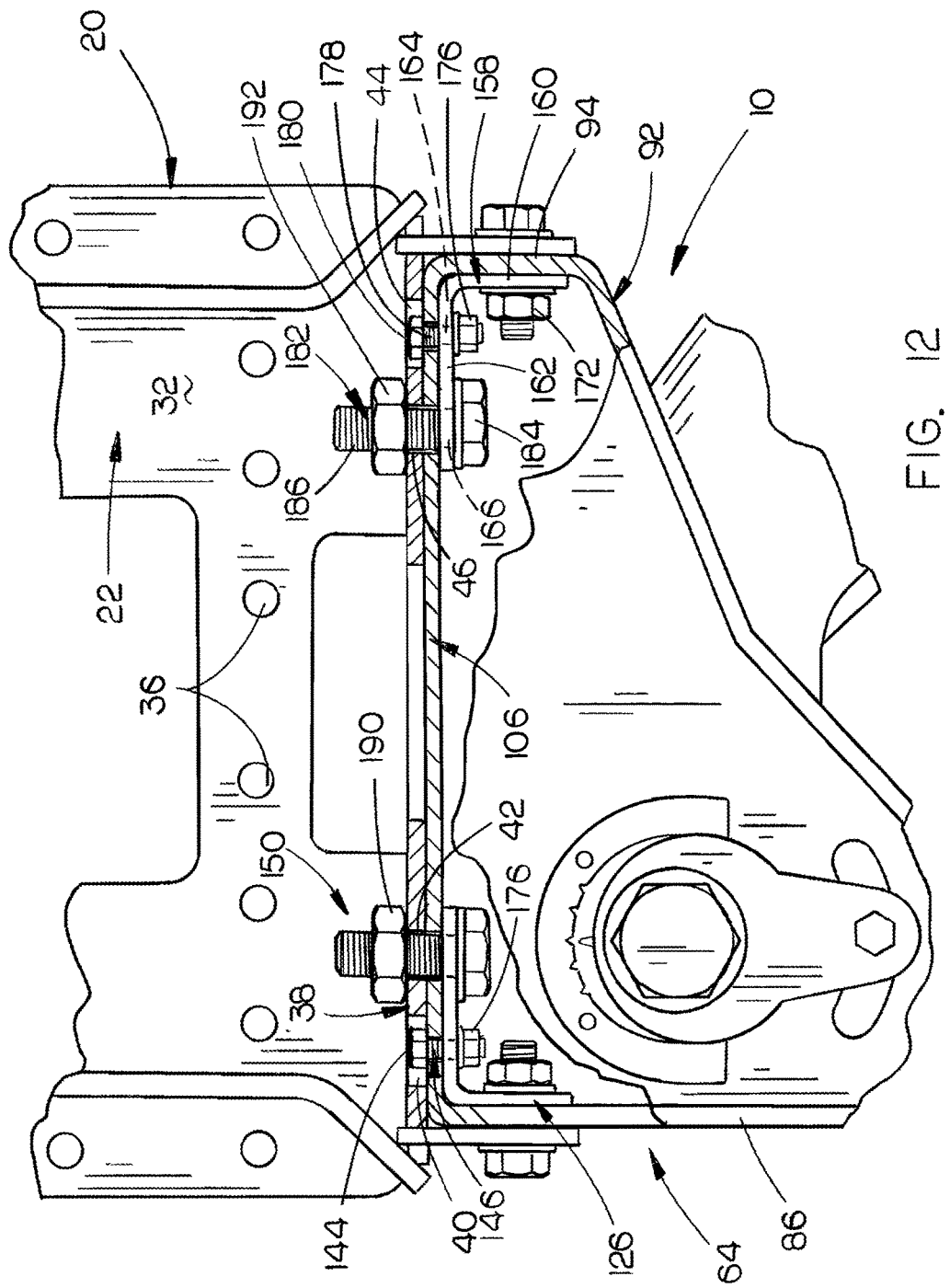
FIG. 12 is a partial sectional view of the mounting system of this invention.

Frame brackets 20 and 20' are bolted to frame members 14 and 16 by bolts 17 and 17' respectively at the forward ends thereof if of the pusher type or at the rearward ends of the frame members 14 and 16 if of the tag type as will be described hereinafter. Inasmuch as frame bracket 20' is a mirror image of frame bracket 20, only frame bracket 20 will be described in detail with "'" indicating identical structure on frame bracket 20'. Frame bracket 20 includes a vertically disposed first mounting plate portion 22 having an upper end 24, a lower end 26, a first end 28, a second end 30, an outer side 32 and an inner side 34. Mounting plate portion 22 has a plurality of bolt opening 36 formed therein to enable frame bracket 20 to be bolted to frame member 14. A horizontally disposed mounting plate portion 38 is secured to the lower end of mounting plate portion 22 and has bolt openings 40, 42, 44 and 46 formed therein. As seen in FIG. 4, bolt openings 42 and 46 are slot-shaped with the lengths or longitudinal axis thereof being disposed transversely with respect to the longitudinal axis of mounting plate portion 38. Gusset plates 48 and 50 are secured to mounting plate portion 38 and the outer side of mounting plate portion 22 by welding. Vertically disposed bracket members 52 and 54 extend downwardly from the first and second ends of mounting plate portion 38 respectively. Bracket member 52 has elongated and horizontally disposed slots 56 and 58 formed therein and bracket member 54 has elongated and horizontally disposed slots 60 and 62 formed therein. If so desired, bracket members 52 and 54 could be integrally formed with gusset plates 48 and 50 respectively.

The numeral 64 refers to a hanger bracket which is secured to frame bracket 20 with the numeral 64' referring to a hanger bracket which is secured to frame bracket 20'. Inasmuch as hanger bracket 64' is a mirror image of hanger bracket 64, only hanger bracket 64 will be described in detail with "'" indicating identical structure on hanger bracket 64'.

Hanger bracket 64 includes a vertically disposed outer side wall 66 having an upper end 68, a lower end 70, a first end 72 and a second end 74. Hanger bracket 64 also includes a vertically disposed inner side wall 76 having an upper end 78, a lower end 80, a first end 82 and a second end 84. Hanger bracket 64 further includes a first end wall 86 having an upper end 88 and a lower end 90 which is secured to the first ends 72 and 82 of side wall 66 and 76 respectively. First end wall 86 is a port of a connector structure 82 which interconnects hanger brackets 64 and 64'. Hanger bracket 64 also includes a second end wall 92 which is secured to the second ends 74 and 84 of side walls 66 and 76 respectively. End wall 92 includes a vertically disposed plate 94 at its upper end which has bolt openings 96 and 98 formed therein. The lower end of end wall 92 has an air spring mounting plate 100 secured thereto. Plate 100 has the lower end of an air spring 102 mounted thereon. End wall 92 has an opening 104 formed therein. A top wall 106 extends over the upper ends of walls 66, 76, 86 and 92. Top wall 106 has bolt openings 108, 110, 112 and 114 formed therein.

The numeral 116 refers to a lift pivot pin which extends between outer side wall 66 and inner side wall 76 of hanger bracket 64. The numeral 118 refers to a lift arm which will be a pusher arm if the lift axle suspension system is of the pusher type or a trailing arm if the lift axle suspension system is of the tag type.

The rearward end of lift arm 118 extends upwardly through opening 104 in end wall 92 of hanger bracket 64 and has its inner end pivotally secured to lift pivot pin 116. Lift arm 118 has an air spring mounting plate 120 secured to the underside thereof. The upper end of air lift spring 102 is secured to plate 120 in conventional fashion. As will be explained hereinafter, end wall 86 has a pair of bolt openings formed therein adjacent the upper end 88 of end wall 86.

The numeral 126 refers to a first mounting strap which is positioned within hanger bracket 64 at the upper first end thereof. Strap 126 includes a vertically disposed strap portion 128 and a horizontally disposed strap portion 130 which extends transversely from the upper end of strap portion 128. Strap portion 130 has bolt openings 132 and 134 formed therein. Strap portion 128 has bolt openings 136 and 138 formed therein. Nut 140 is welded to the inner side of strap portion 128 so as to register with bolt opening 136. Nut 142 is welded to the inner side of strap portion 128 so as to register with bolt opening 138. A nut 144 is welded to the underside of strap portion 130 so as to register with bolt opening 132 thereof.

A bolt 146 extends downwardly through bolt opening 108 in top wall 106 of hanger bracket 64 and through bolt opening 132 in strap portion 130 for threadable connection to nut 144. The head 148 of bolt 146 is spaced above top wall 106 for a purpose to be explained hereinafter. A bolt 150 having a head 152 and a threaded shank 154 extends upwardly through bolt opening 134 in strap portion 130 and extends upwardly through bolt opening 110 in top wall 106. The head 152 of bolt 150 is welded to the underside of strap portion 130.

The numeral 158 refers to a second mounting strap which is positioned within hanger bracket 64 at the upper second end thereof. Strap 158 includes a vertically disposed strap portion 160 and a horizontally disposed strap portion 162 which extends transversely from the upper end of strap portion 160. Strap portion 162 has bolt openings 164 and 166 formed therein. Strap portion 160 has bolt openings 168 and 170 formed therein. Nut 172 is welded to the inner side of strap portion 160 so as to register with bolt opening 168. A nut (not shown) is welded to the inner side of strap portion 160 so as to register with bolt opening 170. A nut 176 is welded to the underside of strap portion 162 so as to register with bolt opening 164.

A bolt 178 extends downwardly through bolt opening 112 in top wall 106 of hanger bracket 64' and through bolt opening 164 in strap portion 162 for threadable connection to nut 176. The head 180 of bolt 178 is spaced above top wall 106 for a purpose to be explained hereinafter. A bolt 182 having a head 184 and a threaded shank 186 extends upwardly through bolt opening 166 in strap portion 162 and extends upwardly through bolt opening 114 in top wall 106 of hanger bracket 64. The head 184 of bolt 182 is welded to the underside of strap portion 162.

The method of attaching the lift axle suspension system to the vehicle 12 will now be described. The frame brackets 20 and 20' are secured to the frame members 14 and 16 by the bolts 17 and 17'. The hanger brackets 64 and 64', with the other components of the lift axle suspension system, are positioned beneath the mounting plates 38 and 38' of the frame brackets 20 and 20'. The hanger brackets 64 and 64' are then raised with respect to the frame brackets 20 and 20'. With respect so that the bolt 150 is received by the slotted opening 42 in mounting plate 38, the head 148 of bolt 146 is received by opening 40, the bolt 182 is received by the slotted opening 46 and the head 178 of bolt 178 is received by opening 44. Nuts 190 and 192 are then threadably secured to bolts 150 and 182. The bolts 150, 146, 182, 178 act as guides for properly positioning the hanger 64 with respect to the frame bracket 20. The same is also true with respect to hanger bracket 64'.

Bolt 194 is then extended inwardly through slot 56 in bracket member 52, through an opening in end wall 72, and through opening 136 in mounting strap 126 for threadable connection to nut 140. Bolt 196 is then extended inwardly through slot 58 in bracket member 52, through an opening in end wall 72, and through opening 138 in mounting strap 126 for threadable connection to nut 142. The slots 56 and 58 permit the hanger bracket 64 to be adjusted with respect to frame bracket 20 or vice versa to accommodate difference in the distance between frame members 14 and 16 or various frame member thicknesses.

The second end of hanger bracket 64 is secured to bracket member 54 by a pair of bolts 198 in the same manner as just described. The bolts 146 and 178 act as torque reactors which stabilize the frame brackets and hanger brackets during the tightening of the various nuts.

The hanger bracket 64' is secured to frame bracket 20' in the same manner as that described herein above.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:
1. In combination:
a load-bearing vehicle including first and second horizontally spaced-apart and longitudinally extending frame members having rearward and forward ends, inner and outer sides, and upper and lower ends;
an axle suspension mounting system comprising:
(a) a first frame bracket secured to said first frame member;
(b) a second frame bracket secured to said second frame member;
(c) a first hanger bracket secured to said first frame bracket; and
(d) a second hanger bracket secured to said second frame bracket;
an axle suspension system secured to said first and second hanger brackets;
each of said first and second frame brackets comprising:
(a) a vertically disposed first mounting plate configured to be secured to the associated frame member and having a first end, a second end, an upper end, a lower end, an inner side and an outer side;
(b) a horizontally disposed and elongated second mounting plate, having a first end and a second end, positioned at said lower end of said first mounting plate;
(c) a vertically disposed first bracket member extending downwardly from said first end of said second mounting plate and being transversely disposed with respect to the longitudinal axis of the associated frame member;
(d) said first bracket member having first and second horizontally disposed slots formed therein;
(e) vertically disposed second bracket member extending downwardly from said second end of said second mounting plate and being transversely disposed with respect to the longitudinal axis of the associated frame member;
(f) said second bracket member having first and second horizontally disposed slots formed therein;
each of said hanger brackets being adjustably secured to the associated frame bracket by bolts extending through the slots in said first and second bracket members of the associated frame bracket into the associated hanger bracket; and
said first and second hanger brackets being configured to have an axle suspension system pivotally secured thereto.
2. The combination of claim 1 wherein the axle suspension system is a tag-type lift axle.

3. The combination of claim 1 wherein the axle suspension system is a pusher-type lift axle.

4. The combination of claim 1 wherein the axle suspension system is an auxiliary axle suspension system.

5. In combination:
a load-bearing vehicle including first and second horizontally spaced-apart and longitudinally extending frame members having rearward and forward ends, and upper and lower ends;
an axle suspension mounting system comprising:
  (a) a first frame bracket secured to said first frame member;
  (b) a second frame bracket secured to said second frame member;
  (c) a first hanger bracket secured to said first frame bracket; and
  (d) a second hanger bracket secured to said second frame bracket;
an axle suspension system secured to said first and second hanger brackets;
each of said first and second frame brackets comprising:
  (a) a vertically disposed first mounting plate configured to be secured to the associated frame member and having a first end, a second end, an upper end, a lower end, an inner side and an outer side;
  (b) said first mounting plate having a plurality of bolt openings formed therein;
  (c) said first mounting plate being secured to the associated frame member by bolts extending through some of said bolt openings in said first mounting plate for connection to the associated frame member;
  (d) a horizontally disposed and elongated second mounting plate positioned at said lower end of said first mounting plate and having a first end and a second end;
  (e) said second mounting plate having a first bolt opening formed therein inwardly of said first end thereof and a second bolt opening formed therein inwardly of said second end thereof;
  (f) said second mounting plate having a first slot formed therein inwardly of said first opening thereof with the longitudinal axis of said first slot thereof being disposed transversely with respect to the longitudinal axis of said second mounting plate;
  (g) said second mounting plate having a second slot formed therein inwardly of said second bolt opening thereof with the longitudinal axis of said second slot thereof being disposed transversely with respect to the longitudinal axis of said second mounting plate;
  (h) a vertically disposed first bracket member extending downwardly from said first end of the second mounting plate and being transversely disposed with respect to the longitudinal axis of the associated frame member;
  (i) said first bracket member having first and second horizontally disposed slots formed therein;
  (j) a vertically disposed second bracket member extending downwardly from said second end of the second mounting plate and being transversely disposed with respect to the longitudinal axis of the associated frame member;
  (k) said second bracket member having first and second horizontally disposed slots formed therein;
each of said first and second hanger brackets comprising:
  (a) a vertically disposed outer side wall having an upper end, a lower end, a first end, a second end, an inner side and an outer side;
  (b) a vertically disposed inner side wall which is horizontally spaced from said outer side wall and having an upper end, a lower end, a first end, a second end, an inner side and an outer side;
  (c) a first end wall which is secured to said first ends of said inner and outer side walls and which extends therebetween with said first end wall having an upper end and a lower end;
  (d) a second end wall which is secured to said second ends of said inner and outer side walls and which extends therebetween with said second end wall having an upper end and a lower end;
  (e) a horizontally disposed top wall extending between said upper ends of said inner and outer side walls and which has a first end, a second end, an inner end, an outer end, a top side and a bottom side;
  (f) said top wall having first and second bolt openings formed therein inwardly of said first end of said top wall and having third and fourth bolt openings formed therein inwardly of said second end of said top wall;
  (g) said second end wall of the hanger bracket having a vertically disposed wall portion at said upper end thereof which has first and second horizontally spaced-apart bolt openings formed therein;
  (h) said first end wall of the hanger bracket having first and second horizontally spaced-apart bolt openings formed therein at said upper end thereof;
  (i) an angular first mounting strap having a horizontally disposed portion and a vertically disposed portion with said horizontally disposed portion and said vertically disposed portion having inner and outer sides;
  (j) said horizontally disposed portion of said first mounting strap having first and second bolt openings formed therein;
  (k) said vertically disposed portion of said first mounting strap having first and second bolt openings formed therein;
  (l) said inner side of said vertically disposed portion of said first mounting strap having first and second nuts fixed thereto which register with said first and second bolt openings in said vertically disposed portion of said first mounting strap;
  (m) said first bolt opening formed in said horizontally disposed portion of said first mounting strap registering with said first bolt opening formed in said top wall of the associated hanger bracket inwardly of said first end of said top wall of the associated hanger bracket;
  (n) said inner side of said horizontally disposed portion of said first mounting strap having a third nut fixed thereto which registers with said first bolt opening in said horizontally disposed portion of said first mounting strap;
  (o) said second bolt opening formed in said horizontally disposed portion of said first mounting strap configured to register with said second bolt opening formed in said top wall of the associated hanger bracket inwardly of said first end of said top wall of the associated hanger bracket;
  (p) a vertically disposed first bolt having a head portion and a threaded shank portion which extends downwardly through said first bolt opening in said top wall of the hanger bracket and which extends through said first bolt opening in said horizontally disposed strap portion of said first mounting strap and which is threadably received by said third nut thereof so that said head portion thereof is positioned above said top wall of the hanger bracket;
(q) a vertically disposed second bolt having a head portion and a threaded shank portion which extends upwardly through said second bolt opening in said horizontally disposed portion of said first mounting strap and being fixed to said horizontally disposed portion of said first mounting strap whereby said head portion of said second bolt is positioned below said horizontally disposed portion of said first mounting strap with said threaded shank portion of said second bolt extending upwardly from said horizontally disposed portion of said first mounting strap and extending upwardly through said second bolt opening in said top wall of the hanger bracket;
(r) a second angular mounting strap having a horizontally disposed portion and a vertically disposed portion with each of said horizontally disposed portion and said vertically disposed portion thereof having inner and outer sides;
(s) said horizontally disposed portion of said second mounting strap having first and second bolt openings formed therein;
(t) said vertically disposed portion of said second mounting strap having first and second bolt openings formed therein;
(u) said inner side of said vertically disposed portion of said second mounting strap having first and second nuts fixed thereto which register with said first and second bolt openings in said vertically disposed portion of said second mounting strap;
(v) said first bolt opening formed in said horizontally disposed portion of said second mounting strap registering with said third bolt opening formed in said top wall of the associated hanger bracket inwardly of said first end of said top wall of the associated hanger bracket;
(w) said inner side of said horizontally disposed portion of said second mounting strap having a third nut fixed thereto which registers with said first bolt opening in said horizontally disposed portion of said second mounting strap;
(x) said second bolt opening formed in said horizontally disposed portion of said second mounting strap configured to register with said fourth bolt opening formed in said top wall of the associated hanger bracket inwardly of said first end of said top wall of the associated hanger bracket;
(y) a vertically disposed third bolt having a head portion and a threaded shank portion which extends upwardly through said third bolt opening in said top wall of the hanger bracket and which extends through said first bolt opening in said horizontally disposed strap portion of said second mounting strap and which is threadably received by said third nut thereof so that said head portion thereof is positioned above said top wall of the hanger bracket; and
(z) a vertically disposed fourth bolt having a head portion and a threaded shank portion which extends upwardly through said second bolt opening in said horizontally disposed portion of said second mounting strap and being fixed to said horizontally disposed portion of said second mounting strap whereby said head portion of said fourth bolt is positioned below said horizontally disposed portion of said second mounting strap with said threaded shank of said fourth bolt extending upwardly from said horizontally disposed portion of said second mounting strap and extending upwardly through said fourth bolt opening in said top wall of the hanger bracket;

said first frame bracket having said first hanger bracket secured thereto by positioning said first hanger bracket with respect to said first frame bracket whereby said head of said first bolt is received by said first bolt opening in said second mounting plate thereof, said second bolt is received by said first slot in said second mounting plate thereof, said third bolt is received by said second bolt opening in said second mounting plate thereof, said fourth bolt is received by said second slot in said second mounting plate, with nuts being secured to said second and fourth bolts;

said first frame bracket also having said first hanger bracket secured thereto by:
  (a) a bolt adjustably extending through said first slot in said first bracket member, through said first bolt opening in said first end wall of the hanger bracket, and through said first bolt opening in said vertically disposed portion of said first mounting strap for threadable connection to said first nut thereof;
  (b) a bolt adjustably extending through said second slot in said first bracket member, through said second bolt opening in said first end wall of the hanger bracket, and through said second hole opening in said vertically disposed portion of said first mounting strap for threadable connection to said second nut thereof;
  (c) a bolt adjustably extending through said first slot in said second bracket member, through said first bolt opening in said second end wall of the hanger bracket, and through said first bolt opening in said vertically disposed portion of said second mounting strap for threadable connection to said first nut thereof; and
  (d) a bolt adjustably extending through said second slot in said second bracket member, through said second bolt opening in said second end wall of the hanger bracket, and through said second bolt opening in said vertically disposed portion of the second mounting strap for threadable connection to said second nut thereof;

said second hanger bracket secured to said second frame bracket in the same manner as said first hanger bracket is secured to said first frame bracket.

6. The combination of claim 5 wherein the axle suspension system is a tag type lift axle.

7. The combination of claim 5 wherein the axle suspension system is a pusher-type lift axle.

8. The combination of claim 5 wherein the axle suspension system is an auxiliary axle suspension system.

* * * * *